(12) United States Patent
Cho et al.

(10) Patent No.: US 10,217,426 B2
(45) Date of Patent: Feb. 26, 2019

(54) DISPLAY DEVICE

(71) Applicant: LG DISPLAY CO., LTD., Seoul (KR)

(72) Inventors: Seungwan Cho, Yangju-si (KR); Seungho Heo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 57 days.

(21) Appl. No.: 15/299,592

(22) Filed: Oct. 21, 2016

(65) Prior Publication Data

US 2017/0116945 A1 Apr. 27, 2017

(30) Foreign Application Priority Data

Oct. 27, 2015 (KR) .......................... 10-2015-0149797

(51) Int. Cl.
*G09G 3/36* (2006.01)
*G02F 1/1333* (2006.01)

(52) U.S. Cl.
CPC ......... *G09G 3/3677* (2013.01); *G09G 3/3688* (2013.01); *G02F 1/133308* (2013.01); *G09G 2310/0248* (2013.01); *G09G 2310/0283* (2013.01); *G09G 2310/0286* (2013.01); *G09G 2310/061* (2013.01)

(58) Field of Classification Search
CPC ............... G09G 3/3677; G09G 3/3688; G09G 2310/0248; G09G 2310/0283; G09G 2310/0286; G09G 2310/061

USPC .................. 345/87–104, 204–215, 690–699
See application file for complete search history.

(56) References Cited

U.S. PATENT DOCUMENTS

| | | | | |
|---|---|---|---|---|
| 2008/0079676 | A1* | 4/2008 | Pak ....................... | G09G 3/3677 345/87 |
| 2010/0007635 | A1* | 1/2010 | Kwon ................... | G09G 3/3677 345/204 |
| 2014/0022229 | A1* | 1/2014 | Choi ..................... | G09G 3/3696 345/212 |
| 2014/0035891 | A1* | 2/2014 | Tanaka .................. | G09G 3/20 345/204 |
| 2015/0243212 | A1* | 8/2015 | Lee ....................... | G09G 3/3216 345/212 |

* cited by examiner

*Primary Examiner* — Stacy Khoo
(74) *Attorney, Agent, or Firm* — Dentons US LLP

(57) ABSTRACT

A display device includes a display panel and a shift register generating a gate pulse and sequentially outputting the gate pulse to gate lines in response to a voltage at a Q node of each of dependently connected stages. An nth (n is a natural number) stage of the shift register includes a pull-up transistor, a start controller, a reset controller, and a first reset output terminal controller. A first reset output controller outputs a reset signal to a reset signal output terminal at a timing at which a second clock signal and a first output control signal output in a non-display period are synchronized.

11 Claims, 7 Drawing Sheets

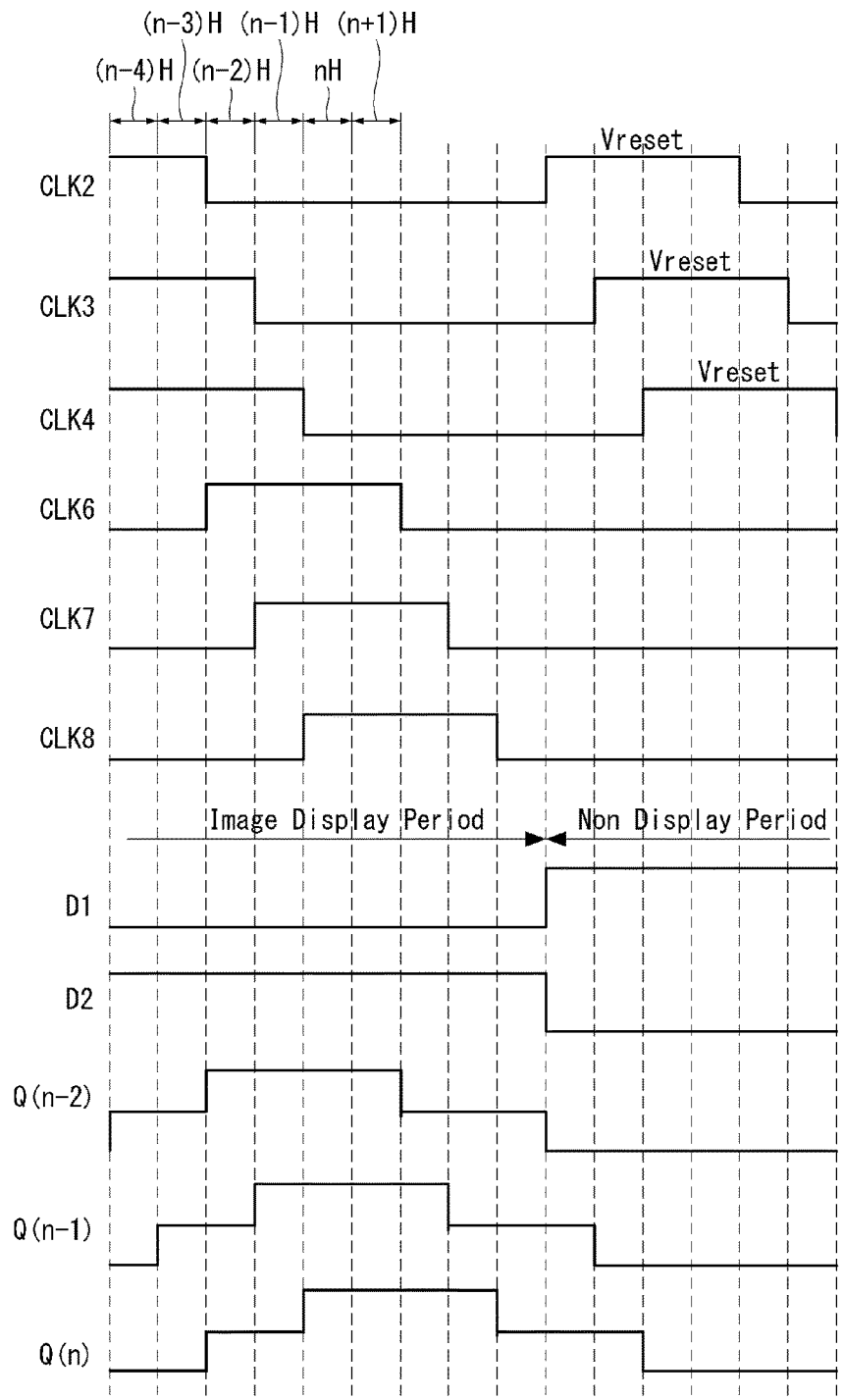

DISPLAY DEVICE

This application claims the benefit of Korea Patent Application No. 10-2015-0149797 filed on Oct. 27, 2015, the entire contents of which are incorporated herein by reference for all purposes as if fully set forth herein.

BACKGROUND

Field of the Invention

The present disclosure relates to a display device with a reduced bezel and a driving method thereof.

Discussion of the Related Art

Display devices have been applied as a transmission medium of visual information to various information appliances or office machines. Cathode ray tubes (CRTs) or Braun tubes, the most widely spread display devices, are problematic in large weight and volume. Various types of flat panel displays that may overcome limitations of CRTs have been developed. In flat panel displays, data lines and scan lines are typically disposed to cross each other and pixels are disposed in a matrix. Video data voltages intended to be displayed are supplied to the data lines, and a gate pulse is sequentially supplied to the gate lines. As video data voltages are supplied to the pixels of a display line to which a gate pulse is supplied and every display line is sequentially scanned by the gate pulse, an image is displayed on the screen.

A gate driver for generating a gate pulse includes a level shifter and a shift register, and the shift register may be implemented in the form of a gate-in-panel (GIP) on one side of the display panel, as illustrated in FIG. 1. In order to apply a gate pulse to each of n number of gate lines, the shift register (or GIP) includes n number of stages ( ... GIP[n−2], GIP[n−1], GIP[n]), and dummy stages (Dummy GIP1, Dummy GIP2, Dummy GIP3). Each of the stages uses an output from a previous stage as a carry signal and stops outputting the gate pulse using an output of a subsequent stage. The dummy stages stop gate pulses output by the last few stages.

Recently, as display panels have high resolution, a time for scanning one gate line is reduced, and thus, a double scan driving method, which divides the single display panel into upper and lower sections and simultaneously performs scanning in both directions, has also been used. As illustrated in FIG. 2, in a display panel driven with the double scan driving method, gate lines positioned in a central portion of the panel are scanned at the last horizontal period of one frame. Since stages GIP[n−2], GIP[n−1], GIP[n]) outputting the last scan pulses are positioned at a center of the display panel, a space for disposing dummy stages is narrow. Thus, in such a double scan driving method, the outputs of a few stages placed at the last position are stopped using separate reset signals (Vrst1, Vrst2, Vrst3).

In order to control the outputs of the stages using the reset signals (Vrst1, Vrst2, Vrst3), a plurality of signal lines for applying the reset signals (Vrst1, Vrst2, Vrst3) may need to be added. Also, the number of reset signals (Vrst1, Vrst2, Vrst3) may need to increase in proportion to the number of phases of the clock signal, and since the number of phases of the clock signal has recently been increasing due to pixel structure and driving scheme, a large number of signal lines may be required, thereby increasing the size of the bezel.

SUMMARY

Accordingly, embodiments of the present disclosure are directed to a display device and a driving method thereof that substantially obviate one or more problems due to limitations and disadvantages of the related art.

An aspect of embodiments of the present disclosure is directed to provide a display device with a reduced bezel.

Additional features and advantages of the present invention will be set forth in the description which follows, and in part will be apparent from the description, or may be learned by practice of the invention. These and other advantages of the present invention will be realized and attained by the structure particularly pointed out in the written description and claims hereof as well as the appended drawings.

To achieve these and other advantages and in accordance with the purpose of embodiments of the invention, as embodied and broadly described herein, a display device may, for example, include a display panel and a shift register generating a gate pulse and sequentially outputting the gate pulse to gate lines in response to a voltage of a Q node of each of dependently connected stages. An nth (n is a natural number) stage of the shift register includes a pull-up transistor, a start controller, a reset controller, and a first reset output terminal controller. In the pull-up transistor, a gate electrode is connected to the Q node, a drain electrode is connected to a first gate clock input line, and a source electrode is connected to a gate pulse output terminal. The start controller charges the Q node in response to a start signal input to the gate electrode. In the reset controller, a gate electrode is connected to a reset signal output terminal, a drain electrode is connected to the Q node, and a source electrode is connected to a low potential voltage input terminal. The first reset output controller outputs a reset signal to the reset signal output terminal at a timing at which a second clock signal and a first output control signal output in a non-display period in which an image is not displayed are synchronized.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 9 is a timing diagram illustrating a change in voltages of major nodes according to operations of a stage.

DETAILED DESCRIPTION OF THE ILLUSTRATED EMBODIMENTS

Figure 1:
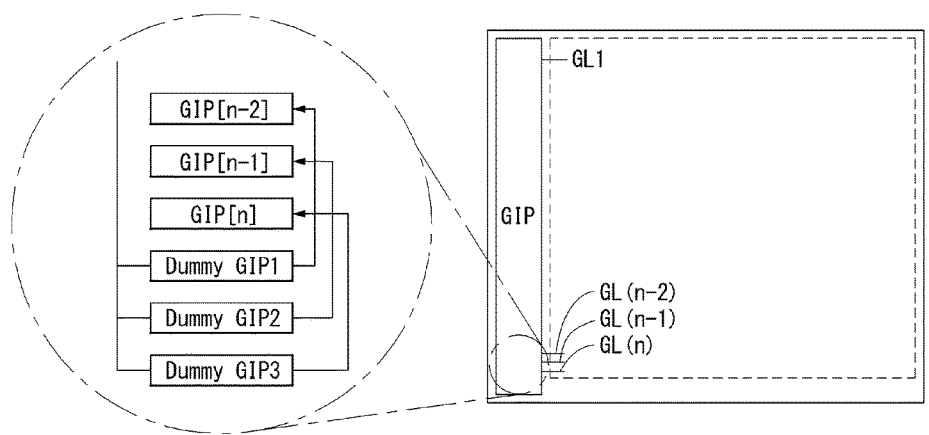
FIGS. 1 and 2 are views illustrating stages and reset signal lines of a shift register according to the related art.
Figure 2:
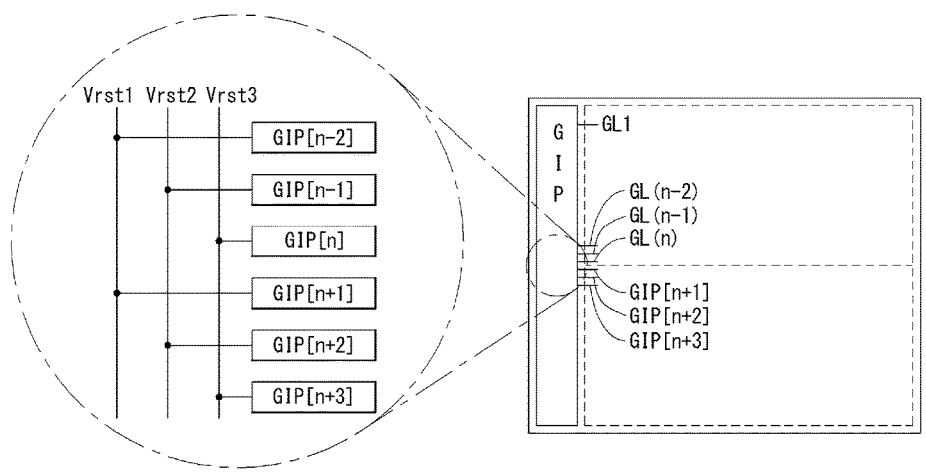

Hereinafter, embodiments of the present disclosure will be described in detail with reference to the accompanying drawings. Like reference numerals refer to like elements throughout. In the following description, if a detailed explanation for a related known function or construction is considered to unnecessarily divert the gist of the present invention, such explanation will be omitted but would be understood by those skilled in the art.

A display device according to an embodiment of the present disclosure may be implemented as a flat panel display device such as a liquid crystal display (LCD), a field emission display (FED), a plasma display panel (PDP), an organic light emitting display device, and the like. In the exemplary embodiments described hereinafter, an LCD device will be mainly described by way of example, but the present disclosure is not limited thereto.

Figure 3:
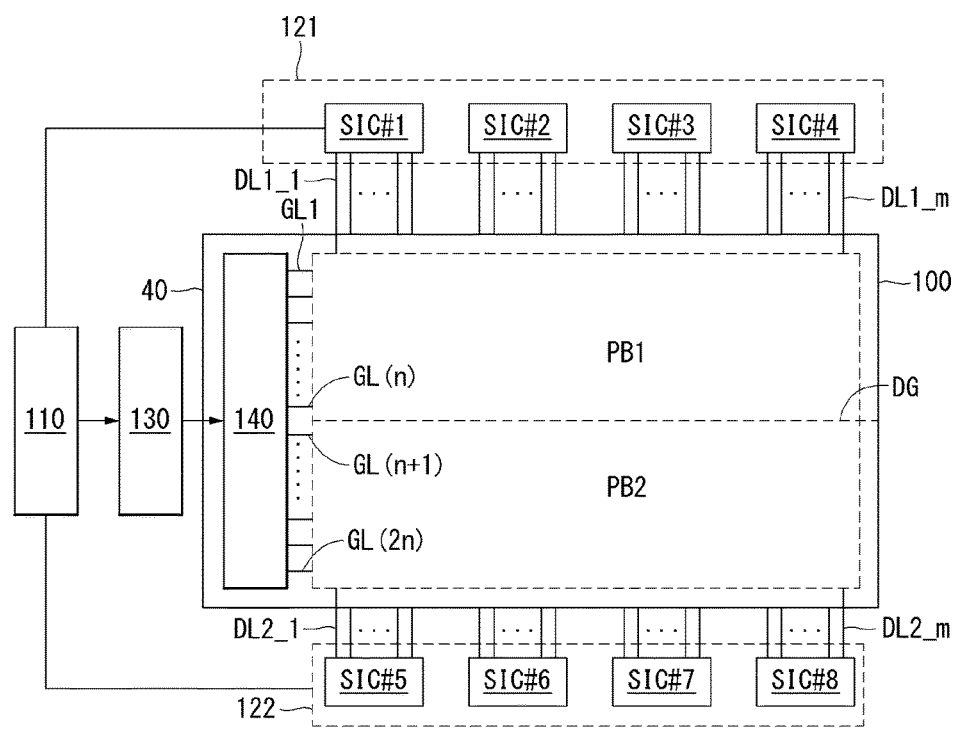
FIG. 3 is a view illustrating a display device according to an embodiment of the present disclosure.
Figure 4:
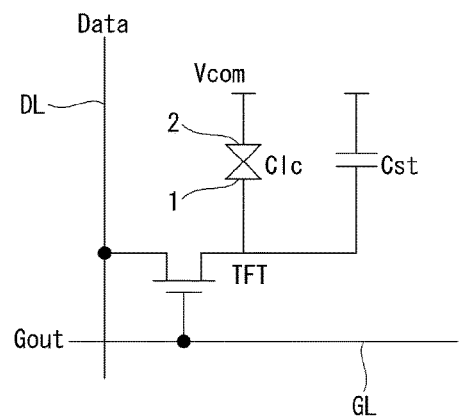
FIG. 4 is a view illustrating an example of a pixel.

FIG. 3 is a view illustrating a display device according to an embodiment of the present disclosure, and FIG. 4 is a view illustrating a pixel structure.

Referring to FIGS. 3 and 4, an LCD device according to an embodiment of the present disclosure includes a liquid crystal panel 100, a timing controller 110, first and second data drivers 121 and 122, and a gate driver 130/140. The liquid crystal panel 100 includes liquid crystal cells disposed in a matrix defined by the crossings of data lines DL and gate lines GL between two substrates.

The liquid crystal display panel 100 includes first and second panel blocks PB1 and PB2. The first panel block PB1 includes first to nth gate lines GL1 to GL[n] arranged in a row direction and (1_1)th to (1_m)th data lines DL1_1 to DL1_m arranged in a column direction. The second panel block includes (n+1)th to 2nth gate lines arranged in a row direction and (2_1)th to (2_m)th data lines DL2_1 to DL2_m arranged in a column direction.

In a thin film transistor (TFT) array substrate of the liquid crystal display panel 100, a pixel array including data lines DL, gate lines GL, TFTs, and storage capacitors is formed. The liquid crystal cell is driven by an electric field between a pixel electrode 1 to which a data voltage is supplied through the TFT and a common electrode 2 to which a common voltage is supplied. A gate electrode of the TFT is connected to a gate line GL, and a drain electrode thereof is connected to the data line DL. A source electrode of the TFT is connected to the pixel electrode 1 of the liquid crystal cell. The TFT is turned on according to a gate pulse supplied through the gate line GL to supply a data voltage from the data line DL to the pixel electrode 1 of the liquid crystal cell. A black matrix, a color filter, a common electrode, and the like, are formed on a color filter substrate of the liquid crystal display panel 100.

The timing controller 110 receives external timing signals such as vertical/horizontal synchronization signals Vsync and Hsync, an external data enable signal DE, a main clock CLK, and the like, from an external host system (not shown) through a low voltage differential signaling (LVDS) interface, a transition minimized differential signaling (TMDS) interface, and the like. The timing controller 20 is connected in series to each of source drive ICs SIC#1 to SIC#8 through a pair of signal lines.

The first and second data drivers 121 and 122 receive video data from the timing controller 110 and convert the video data into analog data voltages. The first data driver 121 includes first to fourth source drive ICs SIC#1 to SIC#4, and supplies data voltages to (1_1)th to (1_m)th data lines DL1_1 to DL1_m formed in the first panel block PB1. The second driver 122 includes fifth to eighth source drive ICs SIC#5 to SIC#8, and supplies data voltages to (1_1)th to (1_m)th data lines DL2_1 to DL2_m formed in the second panel block PB2. Each of the source drive ICs SIC#1 to SIC#8 may be connected to the data lines of the liquid crystal display panel 10 through a chip-on-glass (COG) process or a tape automated bonding (TAB) process.

Gate drivers 130/140 sequentially supplies a gate pulse to the gate lines GL under the control of the timing controller. The gate pulse output from the gate driver is synchronized with data voltages.

The gate driver 130/140 includes a level shifter 130 and a shift register 140 connected between the timing controller 110 and the gate lines of the display panel 100. The level shifter 130 level-shifts a transistor-transistor-logic (TTL) level voltage of gate clocks CLK input from the timing controller 110 to a gate high voltage VGH and a gate low voltage VGL. The shift register 140 includes stages shifting a gate start pulse VST according to a gate clock CLK to sequentially output a gate pulse Gout. The shift register 140 includes a first shift register 140-1 and a second shift register 140-2. The first shift register 140-1 applies a gate pulse to first to nth gate lines GL1 to GL[n] disposed in the first panel block PB1 and the second shift register 140-2 applies a gate pulse to (n+1)th to 2nth gate lines (n+1)th to 2nth gate lines GL[n+1] to GL[2n] disposed in the second panel block PB2.

Figure 5:
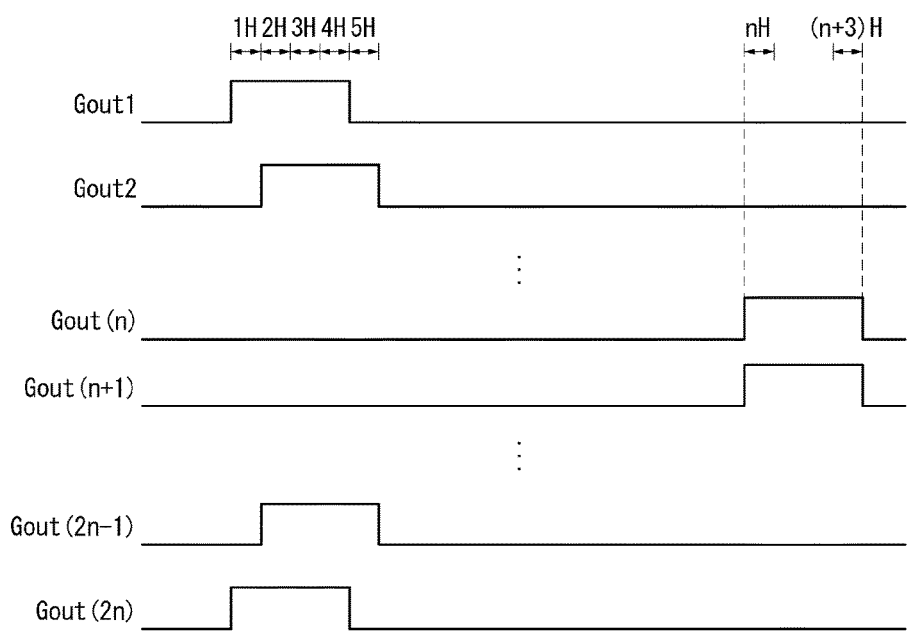
FIG. 5 is a view illustrating timing of a gate pulse.

FIG. 5 is a view illustrating a timing of a gate pulse output by the shift register 140.

Referring to FIG. 5, in order to drive the first and second panel blocks PB1 and PB2 in a double-scan manner, the shift register 140 outputs a pair of gate pulses at the same timing. The pair of gate pulses are applied to the first block PB1 and the second panel block PB2, respectively.

For example, during first to fourth horizontal periods 1H to 4H, the first shift register 140-1 applies a first gate pulse Gout1 to the first gate line GL1, and the second shift register 140-2 applies a 2nd gate pulse Gout to the 2nd gate line GL2n. The first shift register 140-1 applies first to nth gate pulses Gout1~Gout[n] to the first to nth gate lines GL1 to GLn disposed in the first panel block PB1. At the same time, the second shift register 140-2 sequentially applies the 2nd gate pulse to (n+1)th gate pulse Gout[n+1] to the 2nd gate line GL2n to (n+1)th gate line GL[n+1]. The gate pulse illustrated in FIG. 5 illustrates an embodiment in which an overlap period occurs between sequentially output gate pulses, for an overlap driving method.

Figure 6:
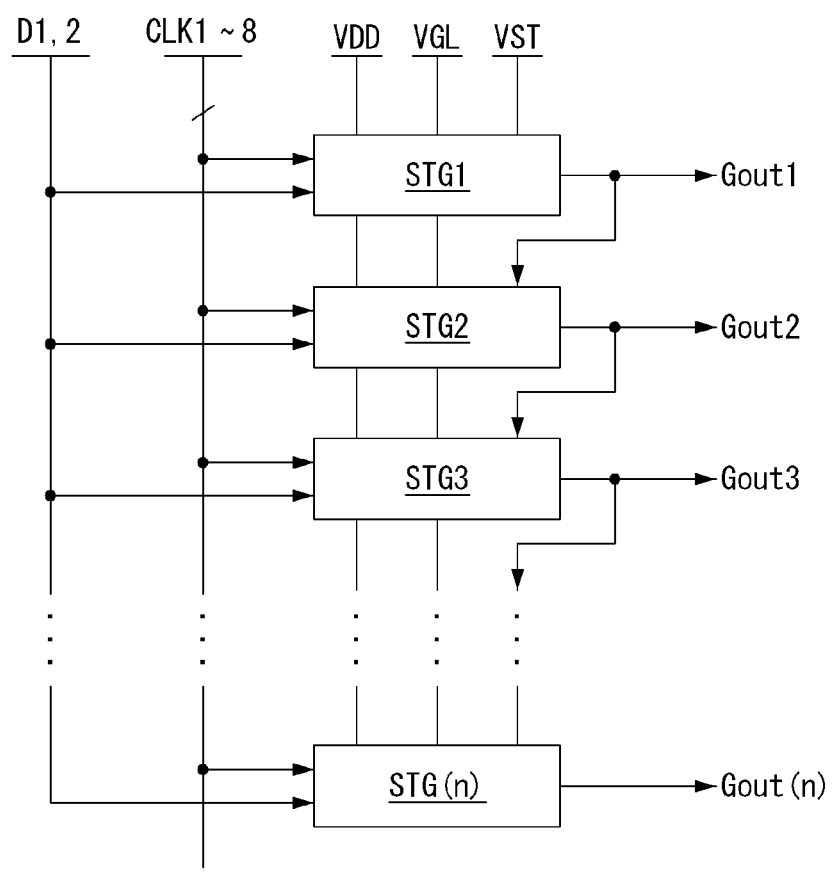
FIG. 6 is a view illustrating a shift register according to an embodiment of the present disclosure.

FIG. 6 is a view illustrating a plurality of stages of the first shift register.

Referring to FIG. 6, the first shift register 140-1 has a plurality of independently connected stages ST1 to STn (n is a natural number of 2 or greater). Each of the stages ST1 to STn outputs a gate pulse to an output terminal. The gate pulses may be applied to the gate lines of the display device and also serve as a carry signal transmitted to a subsequent stage.

In the following description, a "previous stage" refers to a stage positioned above a reference stage. For example, with respect to a kth (k is a natural number, wherein 1<k<n) stage STGk, a previous stage designates any one of a first stage STG1 to (k−1)th stage ST[k−1]. A "subsequent stage" refers to a stage below the reference stage. For example, with respect to the kth (1<k<n) stage STGk, a subsequent stage designates any one of (k+1)th stage STG[k+1] to nth stage.

Figure 7:
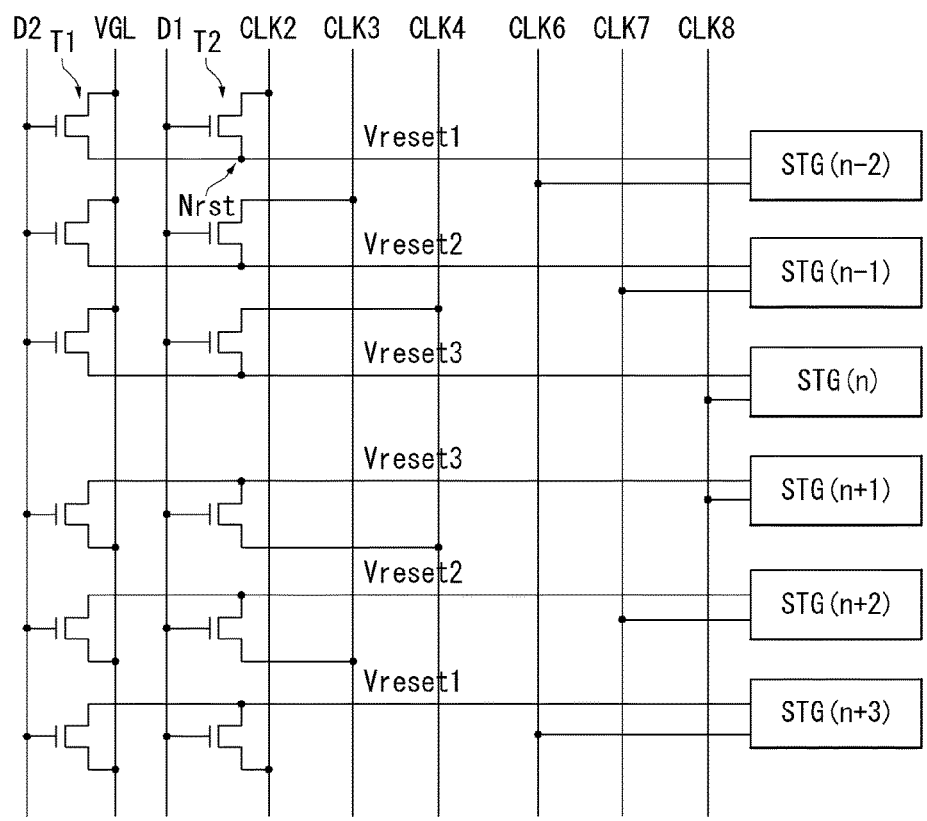
FIG. 7 is a view illustrating a connection relationship between stages of shift registers and clock signals.
Figure 8:
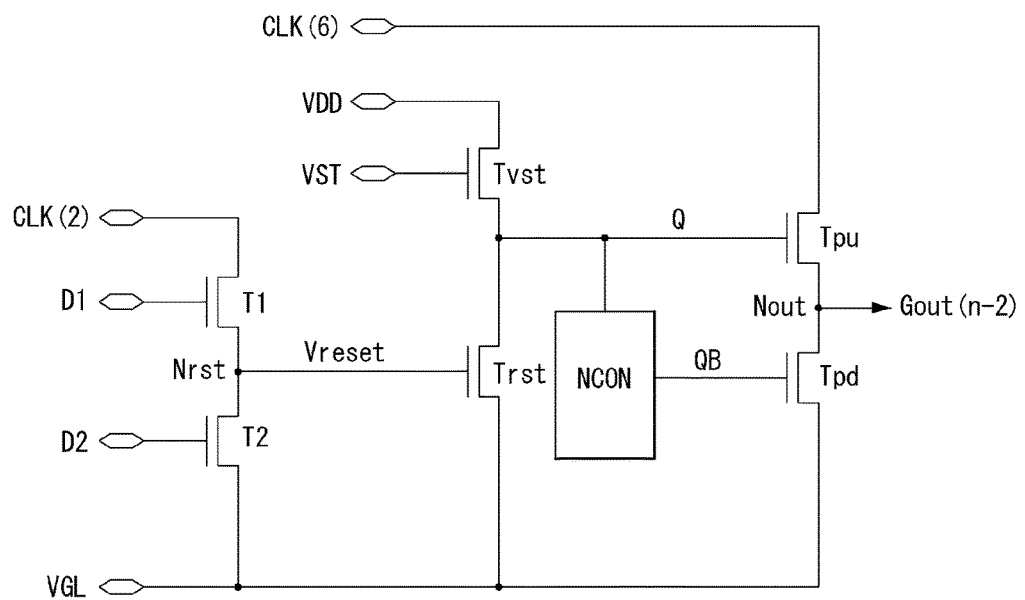
FIG. 8 is a view illustrating an example of a stage.

FIG. 7 is a view illustrating stages and signal lines connected thereto, and FIG. 8 is a view illustrating a configuration of (n−2)th stage STG[n−2]. FIGS. 7 and 8 are described on the basis of a gate clock having 8 phases, but the phase of the gate clock is not limited thereto. Also, the phase of the gate clock may vary according to the number of gate lines included in the phase and each shift register.

In the shift register illustrated in FIG. 8, a pull-up transistor Tpu receives a first gate clock, and a reset output terminal controller T1 receives a second gate clock. The first and second gate clocks mean that phases thereof are different from each other, and a phase difference of each gate clock may vary according to the number of phases of the gate clock and a pulse width of the gate clock. An embodiment, in which a sixth gate clock is used with a first gate clock, a second gate clock uses a second gate clock, each gate clock has a 8 phase, and a pulse width is maintained during 4 horizontal periods, will be described with reference to FIGS. 7 and 8 by way of example.

Referring to FIGS. 7 and 8, a stage of a shift register according to an embodiment of the present disclosure includes a pull-up transistor Tpu, a pull-down transistor Tpd, a node controller, a start controller, a reset controller Trst, and first and second reset output terminal controllers.

An (n−2)th stage STG[n−2] includes a pull-up transistor Tpu, a pull-down transistor Tpd, a start control transistor Tvst, and a node control circuit NCON.

The pull-up transistor Tpu outputs an Nth gate clock CLKN according to a voltage of a Q node Q. The pull-down transistor Tpd discharges a voltage of a gate pulse output terminal Nout to a low potential voltage VSS when a QB node QB is charged. A start control transistor Tvst is turned on upon receiving an output from a previous stage, to charge the Q node Q. The node control circuit NCON controls voltages of the Q node Q and the QB node QB. A detailed configuration of the node control circuit NCON[k] may be any known configuration.

The reset controller Trst discharges a voltage of the Q node Q to a low potential voltage VGL according to a potential of a reset signal output terminal Nrst. To this end, the reset controller Trst may be configured as a transistor in which a gate electrode is connected to a reset signal output terminal Nrst, a drain electrode is connected to the Q node Q, and a source electrode is connected to a low potential voltage VGL line.

The first reset output terminal controller T1 outputs a reset signal to the reset signal output terminal Nrst at a timing at which a sixth gate clock CLK6 and a first output control signal D1 are synchronized. To this end, a first reset output terminal controller T1 includes a drain electrode connected to a second gate clock CLK 2 input line, a source electrode connected to a reset signal output terminal, and a gate electrode connected to a first output control signal input terminal.

A second reset output terminal controller T2 discharges a voltage of the reset signal output terminal Nrst at a timing at which a second output control signal D2 is input. A second reset output terminal controller T2 includes a drain electrode connected to a reset signal output terminal, a source electrode connected to a low potential voltage input terminal, and a gate electrode connected to a second output control signal D2 input terminal.

FIG. 9 is a view illustrating gate clocks applied to stages and changes in voltages of the Q node. FIG. 9 illustrates an embodiment in which an Nth gate clock CLK[N] input to the drain electrode of the pull-up transistor Tpu is a sixth gate clock CLK6, an (N−4)th gate clock CLK[N−4] input to the drain electrode of the first reset output terminal controller T1 is a second gate clock CLK2.

An operation of the stages will be described with reference to FIGS. 7 to 9.

During (n−4)th and (n−3)th horizontal periods [n−4]H and [n−3]H, a start control transistor Tvst of an (n−2)th stage STG[n−2] is turned on in response to a start signal, to precharge the Q node Q with a high potential voltage VDD.

During (n−2)th to (n+1)th horizontal periods [n−2]H and [n+1]H, a pull-up transistor Tpu of an (n−2)th stage STG [n−2] receives a sixth gate clock CLK6. The Q node Q, a gate electrode of the pull-up transistor Tpu, is bootstrapped by a sixth gate clock CLK6 applied in a state in which the Q node Q[k] is precharged. During the process in which the Q node Q is bootstrapped, when a gate-source potential of the pull-up transistor Tpu reaches a threshold voltage Vth, the pull-up transistor Tpu is turned on. As a result, an [n−2]th gate pulse Gout[n−2] corresponding to a high level voltage of the sixth gate clock CLK6 is output.

In the same manner, an (n−1)th stage STG[n−1] and an nth stage STN[n] output a gate pulse. The first shift register completes an operation of the image display period with an nth gate pulse Gout[n] output by the nth stage STG[n] as a final gate pulse.

At a start time of a non-display period during which an image is not displayed, a first output control signal D1 is applied as a high potential voltage. During the non-display period, the first reset output terminal controller T1 is turned on by a first output control signal D1 having a high potential voltage, and a reset signal Vreset corresponding to a voltage of a second clock signal is output to a reset output terminal Nrst.

A reset controller Trst is turned on by the reset signal Vreset applied through the reset output terminal Nrst to discharge a voltage of the Q node Q as a low potential voltage VGL.

In the embodiment described above, the reset signal Vreset uses a timing of a gate clock. That is, the reset signal Vreset illustrated in FIG. 9 uses a second gate clock CLK2 and the second gate clock CLK2 is applied to a pull-up transistor of an (n−6)th stage.

During a display period in which an image is displayed, the second reset output terminal controller T2 is turned on in response to a second output control signal D2, to maintain the reset output terminal Nrst at a low potential voltage VGL. That is, the second reset output terminal controller T2 prevents the reset controller Trst from being turned on during the image display period. In a case in which the reset controller Trst is unintentionally turned on during the image display period, the Q node Q may be discharged, making an output of a gate pulse unstable. The second reset output terminal controller T2 restrains an operation of the reset controller Trst during the image display period to present the Q node Q from being discharged.

As described above, the stage does not require an extra dummy stage for discharging the Q node Q. That is, even though the display panel is divided into the first panel block PB1 and the second panel block PB2 to employ a double-scan scheme, a dummy stage for discharging the Q nodes of several stages outputting a final gate pulse at a central portion of the display panel may not be required.

Also, a signal line for applying an extra reset signal to several stages finally outputting a gate pulse may not be required. As described above, in order to apply a reset signal to each stage, a plurality of signal lines according to the number of phases of the reset signals are typically required. If the number of phases of a clock is ten, ten signal lines for applying a reset signal to each of the ten stages finally outputting a gate pulse are typically required. In contrast, in the embodiment described above, the Q nodes of stages of all the shift registers may be discharged, regardless of the number of phases of a gate clock in a state in which only the low potential voltage input line and the first and second output control signal lines are added. As a result, a bezel size of the display panel may be reduced.

In the aforementioned embodiments, voltage levels of the clock signal and the first and second output signals are set on the basis of the transistors implemented with N-type semiconductor. Thus, when the pull-up transistor, the pull-down transistor, the start control transistor, the reset controller, and the first and second transistors are implemented with P-type semiconductor, voltage levels of each clock signal and the output control signals may be reversed.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel having a plurality of gate lines; and
   a shift register that generates a gate pulse and sequentially outputs the gate pulse to the plurality of gate lines in response to a voltage at a node (Q) of each of dependently connected stages,
   wherein an nth (n is a natural number) of the shift register comprises:
   a pull-up transistor in which a gate electrode is connected to the node (Q), a drain electrode is connected to a first gate clock input line, and a source electrode is connected to a gate pulse output terminal;
   a start controller that charges the node (Q) in response to a start signal input to the gate electrode;
   a reset controller in which a gate electrode is connected to a reset signal output terminal, a drain electrode is connected to the node (Q), and a source electrode is connected to a low potential voltage input terminal; and
   a first reset output controller that outputs a reset signal to the reset signal output terminal at a time at which a second gate clock signal and a first output control signal output in a non-display period are synchronized,
   wherein the first reset output controller comprises a drain electrode directly connected to an input terminal of the second gate clock signal, a source electrode directly connected to the reset signal output terminal, and a gate electrode directly connected to an input terminal of the first output control signal.

2. The display device of claim 1, wherein the second gate clock is applied to a drain electrode of pull-up transistors of first to (n−1)th stages.

3. The display device of claim 1, wherein a rising time of the second gate clock comes after a predetermined period has lapsed from a falling time of the first gate clock.

4. The display device of claim 1, wherein the shift register further comprises: a second reset output terminal controller discharging a voltage of the reset signal output terminal at a timing at which a second output control signal output in a display period is synchronized.

5. The display device of claim 4, wherein the second reset output terminal controller comprises:
   a drain electrode connected to the reset signal output terminal;
   a source electrode connected to the low potential voltage input terminal; and
   a gate electrode connected to an input terminal of the second output control signal.

6. The display device of claim 2, wherein the second gate clock is applied as a high potential voltage at an end of the first gate clock.

7. The display device of claim 6, wherein the first and second gate clocks hold 4 horizontal periods, and
   wherein the second gate clock is applied to a drain electrode of a pull-up transistor of (n−4)th stage.

8. The display device of claim 1, wherein the first output control signal holds a low voltage level during a display period.

9. The display device of claim 4, wherein the second output control signal holds a low voltage level during the non-display period.

10. The display device of claim 1, wherein the display panel includes;
    a first panel block (PB1) includes first to nth gate lines (GL1 to GL[n]) arranged in a row direction; and
    a second panel block includes (n+1)th to 2nth gate lines arranged in a row direction.

11. The display device of claim 10, further comprising
    a first data driver that supplies data voltages to data lines in the first panel block; and
    a second driver that supplies data voltages to data lines in the second panel block.

* * * * *